United States Patent

Fowler

[15] 3,670,315

[45] June 13, 1972

[54] MAGNETIC DISK MEMORY SPINDLE ASSEMBLY

[72] Inventor: Robert R. Fowler, 10625 Northridge Hill Drive, Chatsworth, Calif. 91311

[22] Filed: May 14, 1970

[21] Appl. No.: 37,235

[52] U.S. Cl. .......................340/174.1 C, 346/74 MD, 279/2, 82/44, 346/137

[51] Int. Cl. .......................G01d 15/28

[58] Field of Search...............340/174.1 C; 346/74 MD, 137; 279/2; 82/44; 274/41.4

[56] References Cited

UNITED STATES PATENTS

| | | | |
|---|---|---|---|
| 3,517,939 | 6/1970 | Jaehn | 279/2 |
| 3,420,537 | 1/1969 | Walters | 279/2 |
| 3,490,778 | 1/1970 | Parker | 279/2 |
| 3,497,226 | 2/1970 | Hohwart et al. | 279/2 |

*Primary Examiner*—Stanley M. Urynowicz, Jr.
*Attorney*—Fraser and Bogucki

[57] ABSTRACT

A spindle assembly provides orthogonal reference surfaces for receiving an annular mounting member for a memory disk assembly having corresponding orthogonal reference surfaces disposed about a central axis. A spindle having a central bore concentric with a central axis turns within a housing on widely spaced bearings. The spindle includes an annular reference surface perpendicular to the central axis and a conical surface concentric with the central axis. A segmented collet has an internal conical surface mating with the conical surface of the spindle as well as a cylindrical reference surface which is orthogonal to the first reference surface and concentric with the central axis. Pins transmit rotational force from the spindle to the collet, and a cage holds the collet against the spindle. A drawbar extends from the cage through the central bore of the spindle and controls movement of the cage, thereby allowing the disk assembly to be selectively engaged or disengaged. The assembly combines stable operation with economy and ease of manufacture.

9 Claims, 3 Drawing Figures

INVENTOR.
ROBERT R. FOWLER
BY
Fraser & Bogucki
ATTORNEYS

INVENTOR.
ROBERT R. FOWLER
BY
*Fraser & Bogucki*
ATTORNEYS

MAGNETIC DISK MEMORY SPINDLE ASSEMBLY

BACKGROUND OF THE INVENTION

1. Field of the Invention

This invention relates to magnetic disk memories and more particularly to a spindle assembly for supporting and rotating a magnetic disk assembly.

2. Description of the Prior Art

Disk assemblies generally comprise three magnetic disks mounted on a precision built annular mounting member. The disk assembly must be positioned with the individual disks a precise distance from magnetic heads. Furthermore, the assembly must rotate at a high rate of speed with no wobble. At the same time, the disk assemblies must be readily removable and interchangeable.

To attain the combination of interchangeability and precision mounting, precise reference surfaces are established on the annular mounting member. The bottom edge of the annulus, which is made very flat and exactly perpendicular to the axis of rotation serves as one reference surface. This annular surface positions the disk assembly on the spindle assembly with the individual disks exactly the proper distance from the magnetic heads. This reference surface also helps to align the axis of rotation of the disk assembly parallel to that of the spindle assembly.

In order to establish a second reference surface, the interior surface of the annular support member is made cylindrical and exactly concentric with the axis of rotation. This interior cylindrical surface fits over an exterior cylindrical surface on the spindle assembly formed by a three-part collet, each part conforming to an annular segment subtending 120°. This construction permits the collet segments to move radially inward toward the axis of rotation, thereby disengaging the annular mounting member of a disk assembly for easy removal and replacement. After a disk assembly is fitted over the collet segments, they are moved radially outward until they frictionally contact the interior cylindrical surface of the annular mounting member, firmly holding it in place concentric with the axis of rotation of the spindle assembly.

The precise, stable rotation which is required of the disk assembly can be attained only if the mating reference surfaces of the spindle assembly are made with a precision equalling the precision of the annular mounting member reference surfaces. One such reference surface is an annular surface provided on a rotatable spindle. This reference surface is made exactly perpendicular to the axis of rotation and is located a proper distance from the recording heads. It mates with the bottom annular reference surface of the annular support member to locate it in the proper position. The other mating reference surface is provided by the collet as previously explained.

Presently known spindle assemblies use a spindle rotating on bearings inside a housing. The spindle, which is rotatably connected to a servo motor at one end, has a machined annular reference surface at the other end which is exactly perpendicular to the axis of rotation. A conical surface extends above the reference surface and tapers upwardly toward the axis of rotation. A central bore extends through the spindle concentric with the central axis of rotation.

These presently known assemblies have a cage positioned on top of the spindle. The cage has a central shaft called a drawbar which extends through the central bore on the spindle and terminates a short distance below the spindle where a spring arrangement forces the shaft downward with respect to the spindle. A release lever which is external to the spindle assembly engages the drawbar for pushing it upwardly against the force of the spring. Thus, the cage is moved up and down as desired.

A key is machined onto the drawbar and slides in a corresponding keyway cut into the spindle to prevent rotation of the cage with respect to the spindle. The key and keyway must be precisely made to allow the cage to slide up and down with respect to the spindle while allowing an absolute minimum of rotational play. For this reason the key-keyway arrangement greatly contributes to the complexity and manufacturing cost of the spindle assembly.

The collet segments fit between the cage and the spindle and are supported from the cage by pins, two for each segment. These pins are solidly affixed to the cage and slidably affixed to the collets by a slot arrangement. The slots permit the collets to move radially outward and inward thereby holding or releasing the inside cylindrical surface of the annular mounting member. At the same time, the segments are restrained from moving up and down or rotating with respect to the cage. This pin and slot arrangement necessitates the drilling and tapping of six holes in the cage as well as the cutting of two slots in each of the three collet segments. Here again the complexity and manufacturing cost of the spindle assembly is unduly magnified.

The collet also has a conical surface opposite the cylindrical reference surface. This conical surface mates with the conical surface of the spindle. A garter spring fits around all three collet segments, forcing them radially inward and maintaining contact between the matching conical surfaces. Thus, when the release lever forces the shaft and cage upward, the pins pull the three collets upward also. While moving upward, the collets are held against the conical surface of the spindle by the garter spring and move radially inward following the slope of the conical surface. The contact between the cylindrical reference surfaces of the collet segments and the annular mounting member is thus disengaged, allowing removal or replacement of the disk assembly. When the release lever is moved downward, the spring forces the shaft and cage downward. The cage in turn forces the three collet segments downward while the conical surface forces them radially outward into binding contact with the internal cylindrical reference surface of the annular mounting member.

It can thus be seen that the prior art provides workable spindle assemblies. However, these assemblies suffer from several disadvantages. As previously noted, the path for rotational force is unduly complex and expensive. The rotational energy is transmitted from a servo motor to the spindle by a belt and pulley arrangement. It then passes through a key and keyway to the cage, and from the cage to the collet via the pin and slot arrangement. Finally, the frictional contact of the collet segments with the disk assembly causes the disk assembly to rotate.

Presently known devices also suffer from disadvantages in the bearing arrangements. They use duplex bearings which reduce the stability of the spindle assembly. Furthermore, these bearings are unduly expensive because of both the requirement for a matched set and the need for a high preload. These bearings tend to be hot running, thereby causing undue heating of the spindle assembly and unnecessary drag on the servo motor. Because the duplex bearings are not sealed or shielded, a seal must be used which adds further heat to the assembly.

The housings of these presently known spindle assemblies are also more complex and expensive to manufacture than necessary. There are several internal surfaces which must be machined and the external shape of the housing is unduly complex.

SUMMARY OF THE INVENTION

A spindle assembly provides a relatively direct drive between a servo motor and a magnetic memory disk assembly. A spindle which includes an annular reference surface perpendicular to the axis of rotation, a central bore concentric with the axis of rotation and a conical surface rotates within a housing on widely spaced bearings. A collet having three equal segments provides a cylindrical reference surface opposite a conical surface. Each of the three collet segments contains a central aperture and is constrained against the cage by a spring. A garter spring encircles the three segments, holding the conical surfaces in mating contact with a corresponding conical surface on the spindle. Three pins which are press fitted into the spindle with each one extending through the central aperture of a different collet segment impart rotational energy from the spindle to the collet.

One advantage of an improved spindle assembly according to this invention is the relatively direct line of the rotational drive force. The drive force passes from the spindle through the three pins directly to the collet. The need for a precision made key and keyway is eliminated and the number of pins is reduced from six to three. This means that only three holes need be drilled and none tapped. These holes are drilled in the spindle rather than in the cage. Furthermore, the two machined slots in each collet segment are eliminated and replaced by a single central bore, thereby greatly decreasing manufacturing costs.

Additional advantages stem from changes in the housing design. The exterior of the housing is simplified, thereby reducing production costs while retaining compatibility with the old design. The simplified interior has a single bore which further reduces production costs and permits the use of inexpensive widely spaced bearings. The bearings can be cool running and either sealed or shielded, eliminating the need for a separate seal. The wide spacing of the bearings decreases wobble by increasing longitudinal stability in the spindle, and bearing preload can be established by simple spring washers.

BRIEF DESCRIPTION OF THE DRAWINGS

A better understanding of the invention may be had from a consideration of the following detailed description, taken in conjunction with the accompanying drawings, in which.

DETAILED DESCRIPTION

Figure 1:
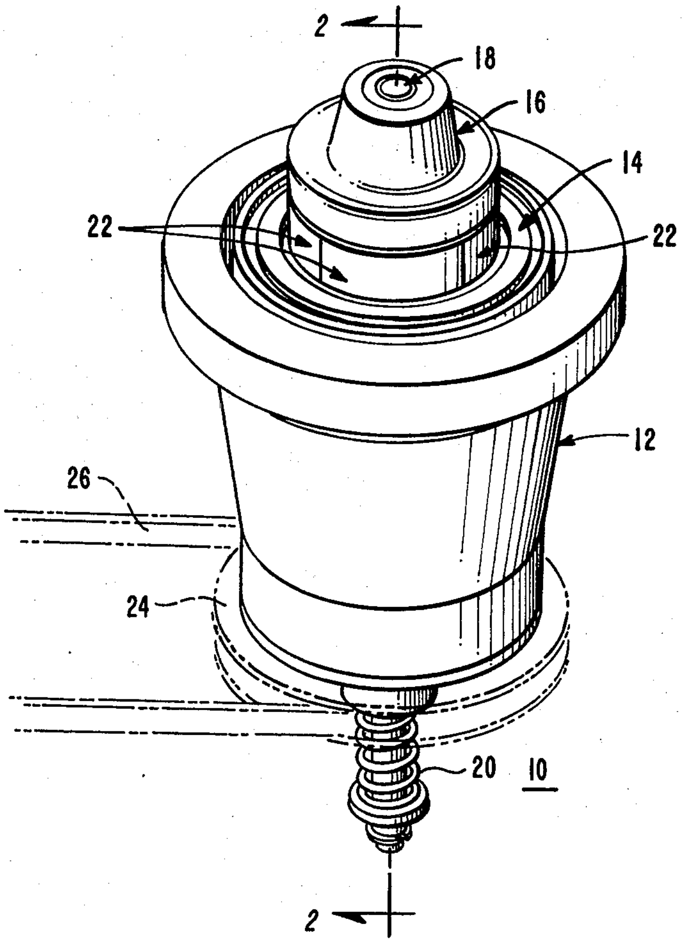
FIG. 1 is a perspective view of a spindle assembly in accordance with the invention.

A magnetic disk memory system utilizes magnetic disk assemblies comprising three spaced apart disks supported by an annular mounting member. This invention provides an improved spindle assembly for holding an annular mounting member and rotating a disk assembly in a precise manner, maintaining each disk a precise distance from a magnetic head while rotating. In order to attain easy interchangeability while maintaining precise mounting, the annular support member is provided with two orthogonal reference surfaces which mate with corresponding reference surfaces on the spindle assembly. The first reference surface is the bottom edge of the annular support member which is perpendicular to the axis of rotation and mates with an annular surface on the spindle assembly. The second reference surface is the inside cylindrical surface of the annular support member. It mates with an outside cylindrical reference surface provided by a segmented collet within the spindle assembly. These collet segments move radially outward for engagement of an annular support member and radially inward for disengagement, thereby facilitating easy interchangeability. Except for improvements in the spindle assembly, such a disk memory system is well known. For this reason the system as a whole is not shown in the drawings, but only referred to by way of explanation.

As shown in FIG. 1 a spindle assembly 10 has a housing 12, a spindle 14 and a cage 16. A drawbar 18 is fastened to the cage 16 and extends through a central bore in the spindle 14. A spring 20, which is restrained by a spring retainer 21 held in place by cir clip 23 snapped into a groove 25, exerts a downward force on the shaft 18. Thus, the drawbar 18 pulls the cage 16 down against a collet having three equal segments 22, holding them in place. A pulley 24 and a belt 26 provide rotational energy to the spindle 14.

Figure 3:
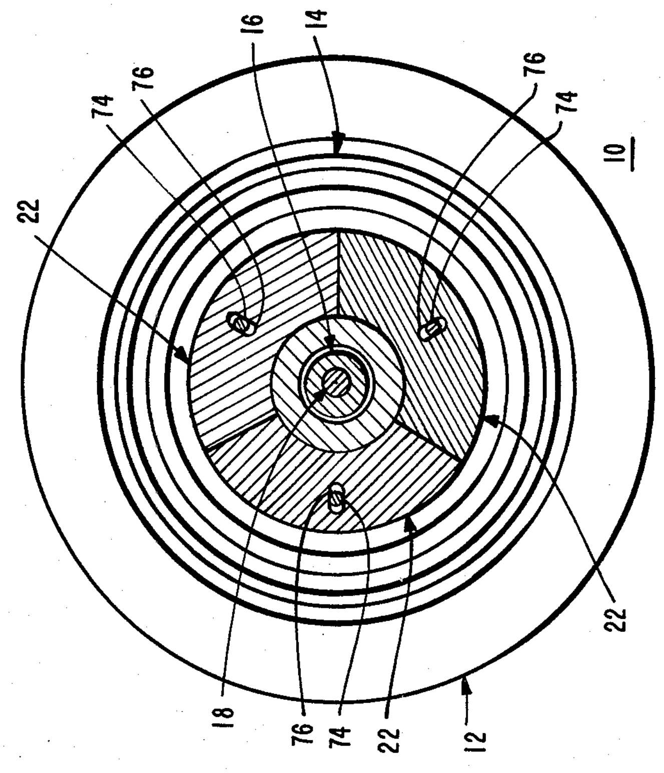
FIG. 3 is a sectional top view of the spindle assembly of FIG. 2 taken along the line 3—3.
Figure 2:
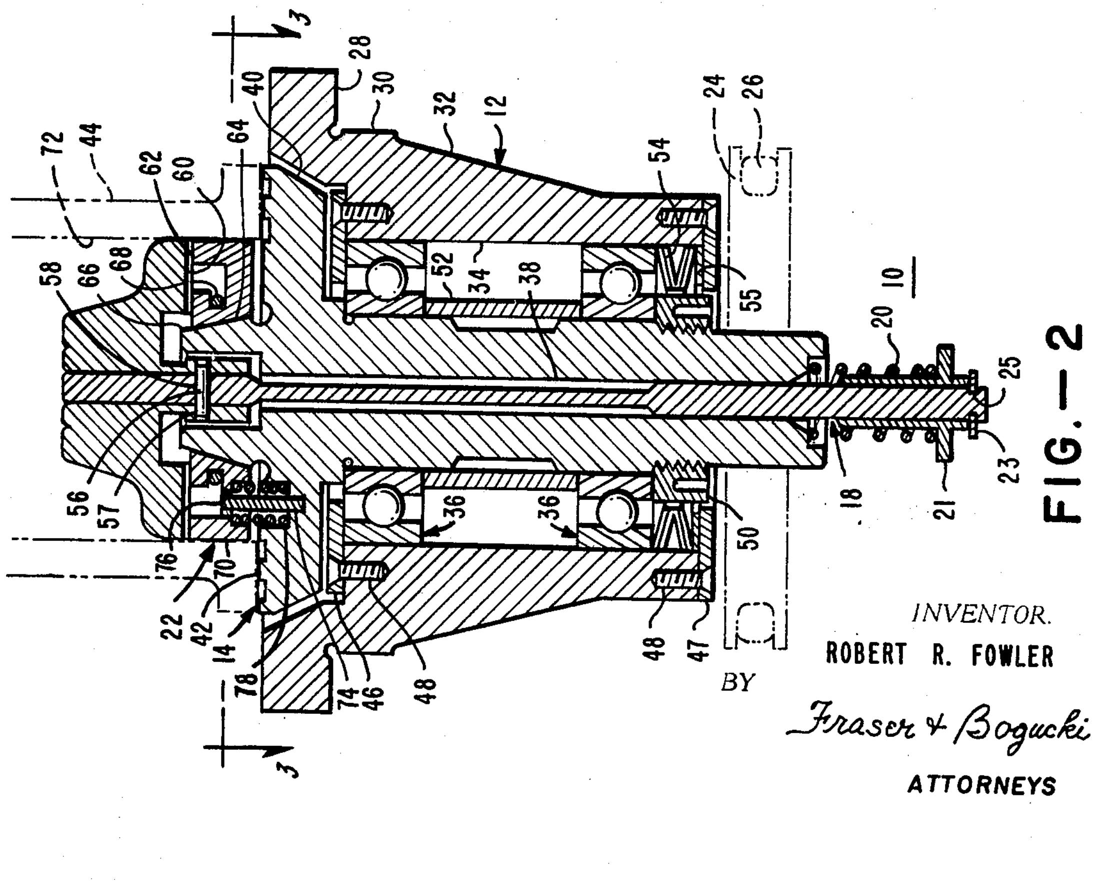
FIG. 2 is a sectional front view of the spindle assembly of FIG. 1 taken along the line 2—2 with a portion of an annular mounting member added thereto.

Referring now to the more detailed views of FIGS. 2 and 3, the housing 12 of the spindle assembly is shown to have a relatively simple design providing ease of manufacture. The housing is precisely located within the disk memory system by a horizontal reference surface 28 which is perpendicular to the central axis of rotation of the spindle 14 and a cylindrical reference surface 30 which is concentric with the central axis of rotation. The remainder of the housing comprises a simple outer design 32 and a central bore 34 which is concentric with the axis of rotation. This simple design facilitates economical casting of the housing.

The spindle 14 rotates in the housing 12 on bearings 36. The spindle 14 which is generally cylindrical has a central bore 38 through which the shaft 18 passes. Near the top of the spindle 14 is an enlarged portion 40 which provides an annular reference surface 42 perpendicular to the axis of rotation and permits an annular mounting member 44 to be precisely and rapidly located on the spindle assembly.

The bearings 35 are held in place by upper and lower collars 46, 47 respectively which are fastened to the housing 12 by screws 48 and by a nut 50 which screws onto the spindle. A spacer 52 separates the bearings and simple spring washers 54 along with a spacing washer 55 establish a preload. The bearings 36 may be relatively inexpensive and either sealed or shielded. The wide spacing increases stability and reduces wobble in the spindle 14.

The cage 16 is fastened to the drawbar 18 by a roll pin 56 through corresponding holes 57, 58 in the cage and shaft respectively. A horizontal surface 60 on the cage 16 presses against corresponding horizontal surfaces 62 on the three collet segments 22, maintaining them in proper alignment as well as in the proper position.

Together the three collet segments form a conical surface 64 which remains in contact with a corresponding conical surface 66 on the spindle 14. A garter spring 68 extends around the three collets and forces them radially inward toward the surface 66. The three collet segments 22 also form a cylindrical reference surface 70 which is concentric with the central axis of rotation and mates with the internal cylindrical reference surface 72 of the annular mounting member 44, holding the member 44 in place exactly concentric with the central axis of rotation.

Three pins 74 are fastened to the spindle 14 by press fit and extend through vertical holes or apertures 76 in the collets 22. The apertures 76 may have an elliptical shape. Coil springs 78 surround the pins 74 and exert an upward force on the three collets 22.

Disk assemblies are interchanged in the following manner. The shaft 18 is forced upward by a lever or other means overcoming the downward force exerted by the spring 20. The cage 14 moves upward with the shaft 18, enabling the springs 78 to push the collet segments 22 upward. The garter spring 68 maintains contact between the two conical surfaces 64, 66 of the collet segments and spindle respectively, causing the collet segments to move radially inward as they move upward. As the segments move radially inward contact between the cylindrical reference surface 70, of the collet and the cylindrical reference surface of the annular mounting member 72 is disengaged so that the disk assembly can be easily removed and replaced by a different one.

After a new disk assembly is in place the drawbar 18 is released allowing the spring 20 to force the drawbar 18 and cage 16 downward. The cage in turn forces the three collet segments 22 downward. As the segments move downward they are forced radially outward until they come into frictional contact with the new annular mounting member. Because the collet segments always remain in contact with the conical surface 66 of the spindle, they always remain precisely concentric with the central axis of rotation. For this reason the cylindrical reference surfaces 70 of the collet segments remain concentric and precisely position the annular mounting member about the central axis of rotation.

The spindle assembly provides a relatively simple and direct path for transmitting rotational energy to the magnetic disk assembly. The belt 26 and pulley 24 receive energy from a servo motor or other device in a well known manner and impart the energy to the spindle 14. The spindle 14 transmits the energy through the pins 74 to the collet segments 22 which pass the energy on to the disk assembly through the frictional contact between the cylindrical reference surfaces 70, 72.

Although there have been described above specific arrangements of a spindle assembly in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. A spindle assembly providing vertical and horizontal reference surfaces for receiving an annular support member of a memory disk assembly having corresponding horizontal and vertical reference surfaces disposed about a central axis comprising:

a housing having a generally cylindrical interior;

a spindle rotatably mounted within said housing and having a central bore concentric with a central axis, said spindle including an upper annular reference surface and a conical surface;

a segmented collet, each segment having a vertical aperture, including a cylindrical reference surface encompassing a conical surface mating with the conical surface of the spindle;

a plurality of pins in fixed relationship to the spindle and extending through the vertical apertures in the collet segments, said pins retaining the collet segments in fixed relation to the spindle during rotation;

means forcing the collet segments toward the central axis of the spindle;

means exerting an upward force on said collet segments;

a cage bearing down on said collet segments;

a drawbar affixed to the cage and extending through the central bore of the spindle;

means for exerting a downward force on said drawbar; and means for coupling the spindle to a rotary drive force.

2. The spindle assembly of claim 1 wherein the spindle is rotatably mounted within the housing on widely spaced bearings.

3. A spindle assembly providing orthogonal reference surfaces for receiving an annular support member of a memory disk assembly having corresponding orthogonal reference surfaces disposed about a central axis comprising:

a housing having a generally cylindrical interior;

a spindle rotatably mounted within said housing on two widely spaced bearings and having a central bore concentric with a central axis, said spindle including a first reference surface perpendicular to the central axis and a conical surface concentric with the central axis;

a three segment collet having at least one aperture parallel to the central axis, each segment forming a one-third segment of a second reference surface, said second reference surface being cylindrical, orthogonal to the first reference surface and concentric with the central axis of the spindle, and each segment having a conical surface opposite the second reference surface mating with the conical surface of the spindle;

a plurality of pins, each extending into a different vertical aperture in a collet segment and affixed to the spindle, said pins retaining the collets in fixed relation to the spindle during rotation;

means holding the conical surface of the collets in contact with the conical surface of the spindle;

means exerting a force having a direction parallel to the central axis and tending to move the collet segments away from the spindle;

a cage bearing on the collet segments and exerting a force opposite that of the exerting means, said cage including a drawbar extending through the central bore of the spindle;

means for applying a force to said drawbar selectively aiding or opposing that of the exerting means; and means for imparting rotational energy to the spindle.

4. A spindle assembly providing orthogonal reference surfaces for receiving an annular support member of a memory disk assembly having corresponding orthogonal reference surfaces comprising:

a housing;

a spindle rotatably mounted within the housing and having a central bore concentric with a central axis, said spindle including a first reference surface perpendicular to the central axis and a conical surface concentric with the central axis;

a plurality of collet segments each having at least one aperture parallel with the central axis, each forming a segment of a second reference surface, said second reference surface being cylindrical, orthogonal to the first reference surface and concentric with the central axis, and each having a conical surface opposite the second reference surface mating with the conical surface of the spindle;

a plurality of pins, each affixed to the spindle and extending into a different aperture in a collet;

a cage having a surface parallel to the first reference surface and bearing on the collets forcing said collets into contact with the spindle, said cage including a shaft extending through the central aperture in the spindle; and means for selectively moving said shaft within the central aperture parallel to the central axis.

5. A spindle assembly comprising:

a housing;

a spindle rotatably mounted within said housing and having a central axis, said spindle including a first reference surface perpendicular to the central axis and a conical surface concentric with the central axis;

a collet having a plurality of segments, each forming a segment of a second reference surface, said second reference surface being cylindrical, orthogonal to the first reference surface and concentric with the central axis, and each having a conical surface opposite the second reference surface segment mating with the conical surface of the spindle;

means restraining substantial relative rotary motion between the spindle and the collet segments; and means for selectively moving the collet segments relative to the spindle in a direction parallel to the central axis.

6. The spindle assembly of claim 5 wherein the first reference surface is an annular surface concentric with the central axis and the spindle is mounted on widely spaced bearings.

7. The spindle assembly of claim 5 wherein the collet comprises three identical segments.

8. A magnetic disk memory assembly comprising:

a housing having a generally cylindrical bore;

a spindle rotatably mounted within said cylindrical bore and having a central axis, said spindle including a first reference surface perpendicular to the central axis and a conical surface concentric with the central axis;

a collet having a plurality of segments, each forming a segment of a conical surface and a segment of a second reference surface opposite the segment of the conical surface, said second reference surface being cylindrical and concentric with the central axis, and each including at least one aperture therethrough;

a plurality of pins, each affixed to the spindle and extending through an aperture in a collet segment, said pins imparting rotational energy directly from the spindle to said collet segments; and means for selectively moving the collets radially outwardly and inwardly with respect to the central axis.

9. The spindle assembly of claim 8 wherein the housing includes annular and cylindrical reference surfaces concentric with the central axis; the first reference surface is an annular surface concentric with the central axis; and each collet segment includes exactly one aperture, said aperture extending through the collet segment parallel to the central axis and having a generally elliptical shape.

* * * * *